(12) United States Patent
Schryer et al.

(10) Patent No.: US 9,044,743 B2
(45) Date of Patent: Jun. 2, 2015

(54) CATALYST FOR DECOMPOSITION OF NITROGEN OXIDES

(75) Inventors: David R. Schryer, Poquoson, VA (US); Jeffrey D. Jordan, Williamsburg, VA (US); Ates Akyurtlu, Yorktown, VA (US); Jale Akyurtlu, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 40 days.

(21) Appl. No.: 12/726,403

(22) Filed: Mar. 18, 2010

(65) Prior Publication Data

US 2010/0190642 A1    Jul. 29, 2010

Related U.S. Application Data

(62) Division of application No. 11/251,543, filed on Sep. 30, 2005, now abandoned.

(51) Int. Cl.
| | |
|---|---|
| *B01J 23/00* | (2006.01) |
| *B01J 21/00* | (2006.01) |
| *B01J 23/62* | (2006.01) |
| *B01D 53/94* | (2006.01) |
| *B01J 23/54* | (2006.01) |
| *B01J 23/56* | (2006.01) |
| *B01J 37/08* | (2006.01) |

(52) U.S. Cl.
CPC ........... *B01J 23/626* (2013.01); *B01D 53/9418* (2013.01); *B01D 2255/1021* (2013.01); *B01D 2255/2073* (2013.01); *B01D 2255/20761* (2013.01); *B01D 2255/2094* (2013.01); *B01J 23/54* (2013.01); *B01J 23/56* (2013.01); *B01J 37/08* (2013.01)

(58) Field of Classification Search
USPC ............... 502/34, 38, 56, 324, 326, 344, 345, 502/347, 355, 415, 438, 439, 107, 258–262, 502/327–339, 349–352

See application file for complete search history.

(56) References Cited

U.S. PATENT DOCUMENTS

| | | | | |
|---|---|---|---|---|
| 3,677,969 | A | * | 7/1972 | Mertzweiller et al. ........ 502/107 |
| 3,677,970 | A | * | 7/1972 | Mertzweiller et al. ........ 502/107 |
| 3,806,582 | A | * | 4/1974 | Acres et al. ................ 423/239.1 |
| 3,839,225 | A | * | 10/1974 | Acres ............................ 502/177 |
| 4,032,475 | A | * | 6/1977 | Knapik et al. ................ 502/223 |
| 4,056,489 | A | | 11/1977 | Hindin et al. |
| 4,058,485 | A | | 11/1977 | Cheung |
| 4,220,559 | A | | 9/1980 | Polinski |
| 4,402,869 | A | * | 9/1983 | Tauster et al. ................ 502/324 |
| 4,536,375 | A | | 8/1985 | Holt et al. |
| 4,581,343 | A | | 4/1986 | Blanchard et al. |
| 4,808,394 | A | * | 2/1989 | Kolts et al. ................. 423/437.2 |
| 4,829,035 | A | | 5/1989 | Upchurch et al. |
| 4,830,844 | A | * | 5/1989 | Kolts ......................... 423/437.2 |
| 4,839,330 | A | | 6/1989 | Hess et al. |
| 4,855,274 | A | | 8/1989 | Upchurch et al. |
| 4,912,082 | A | | 3/1990 | Upchurch et al. |
| 4,991,181 | A | | 2/1991 | Upchurch et al. |
| 5,543,374 | A | * | 8/1996 | Wu .............................. 502/107 |
| 5,547,913 | A | * | 8/1996 | Muramoto ................... 502/328 |
| 5,585,083 | A | | 12/1996 | Kielin et al. |
| 5,856,263 | A | * | 1/1999 | Bhasin et al. ................ 502/333 |
| 5,895,636 | A | * | 4/1999 | Nguyen et al. ............. 423/245.1 |
| 5,935,897 | A | * | 8/1999 | Trubenbach et al. ......... 502/172 |
| 5,948,965 | A | | 9/1999 | Upchurch et al. |
| 6,132,694 | A | | 10/2000 | Wood et al. |
| 6,274,763 | B1 | * | 8/2001 | Ruedinger et al. ............ 562/548 |
| 6,399,035 | B1 | * | 6/2002 | Tabata et al. ................ 423/213.5 |
| 2003/0139290 | A1 | | 7/2003 | Jordan et al. |
| 2003/0144143 | A1 | | 7/2003 | Jordan et al. |
| 2005/0181940 | A1 | * | 8/2005 | Wang et al. .................. 502/330 |

* cited by examiner

*Primary Examiner* — Cam N. Nguyen
(74) *Attorney, Agent, or Firm* — Andrea Z. Warmbier; Helen M. Galus

(57) ABSTRACT

This invention relates generally to a platinized tin oxide-based catalyst. It relates particularly to an improved platinized tin oxide-based catalyst able to decompose nitric oxide to nitrogen and oxygen without the necessity of a reducing gas.

3 Claims, No Drawings

CATALYST FOR DECOMPOSITION OF NITROGEN OXIDES

CROSS-REFERENCE TO RELATED PATENT APPLICATIONS

This application is a divisional application of commonly-owned patent application U.S. patent application Ser. No. 11/251,543, filed Sep. 30, 2005, now abandoned, the contents of which are incorporated herein by reference in their entirety.

ORIGIN OF THE INVENTION

The invention described herein was made in the performance work under a NASA contract and by employees of the United States Government and is subject to the provisions of Public Law 96-517 (35 U.S.C. 202) and may be manufactured and used by or for the Government for governmental purposes without the payment of any royalties thereon or therefor.

BACKGROUND OF THE INVENTION

1. Field of the Invention

This invention relates generally to a platinized tin oxide-based catalyst. It relates particularly to an improved platinized tin oxide-based catalyst able to decompose nitrogen oxide species (NOx) to nitrogen and oxygen without the necessity of a reducing gas.

2. Description of the Related Art

Nitrogen oxides (NOx), including NO, are generated by high-temperature combustion processes, such as those that occur in internal combustion engines. Nitrogen oxides are corrosive and contribute to acid rain; therefore, their presence in the atmosphere is undesirable. Fortunately, nitrogen oxides are thermodynamically unstable at low and near ambient temperatures and should decompose at such temperatures to nitrogen and oxygen. Unless accelerated by catalysis, however, this decomposition occurs so slowly as to be inconsequential during practical time spans. As a result, considerable effort has gone into the development of a catalyst to accelerate this decomposition.

Many catalysts have been developed that will decompose nitrogen oxides in reducing environments. Heretofore, however, no catalyst has been developed that will decompose nitrogen oxides in non-reducing environments. This results in many disadvantages, including reduction of the efficiency of internal combustion engine systems.

Automotive catalytic converter technology has changed little since its inception over 25 years ago when automotive emission regulations were first implemented. Typical catalyst coatings consist of a series of aluminum oxide (alumina) washcoat- and precious-metal layers baked on the honeycomb channels of a ceramic substrate. The thick (~150 microns) catalyst coating comprises approximately 30% of the total weight of the substrate. These coated "bricks" are then assembled and sealed inside a stainless steel can to allow coupling to the automotive exhaust manifold. As EPA emission regulations have tightened, the industry response has been to increase the size of the bricks, increase precious metal loading, and move the catalytic converter in closer proximity to the engine, thereby increasing exhaust temperatures for improvement in catalytic activity. The outcome of these changes has been ever increasing costs for catalytic converter products. In addition, these changes have had a negative impact on automobile fuel efficiency.

In response to the need for the next generation of catalysts for automotive applications, low-temperature oxidation catalysts were developed by NASA Langley Research Center. These improved catalysts are described in U.S. Pat. Nos. 4,829,035; 4,839,330; 4,855,274; 4,912,082; 4,991,181; 5,585,083; 5,948,965; 6,132,694; 7,390,768; and 7,318,915 which patents are hereby incorporated by reference herein as if set forth in their entireties. These catalysts exhibit several key advantages over the current state-of-the-art. First, unlike the thick, inert layer of alumina used in conventional catalyst technology, generally these catalysts can use a single active tin oxide-based coating (<5 microns) that enhances the catalytic performance by acting as an oxygen storage device. Second, their active washcoat reduces the temperature (i.e., light off) at which the catalyst begins converting toxic to nontoxic gases, as well as, requiring less precious metal to attain the same toxic gas conversion efficiency over time. Third, these catalysts are capable of capturing enough oxygen from the natural exhaust stream to effect the chemical reactions. Unlike traditional catalytic converter technology, external air sources and ancillary sensors, air pumps, and hoses are not required for catalytic converter operation.

Despite their improvement over existing catalysts, these low-temperature tin-oxide catalysts failed to decompose nitric oxide to nitrogen and oxygen without the necessity of a reducing gas. There still exists a need for such a catalyst.

SUMMARY OF THE INVENTION

The present invention is a catalyst for the decomposition of nitrogen oxides without the necessity of a reducing gas. The present invention improves the existing low-temperature catalyst, originally developed for use in internal combustion engine emissions applications, described generally in U.S. Pat. Nos.: 4,829,035, 4,839,330, 4,855,274, 4,912,082, 4,991,181, 5,585,083, 5,948,965, and 6,132,694. The present invention serves to catalyze the decomposition of nitrogen oxides to nitrogen and oxygen at typical room temperatures without the need for a reducing species to be present.

DETAILED DESCRIPTION OF THE INVENTION

The catalyst composite described herein is created by heating a catalyst comprising at least one noble metal and at least one metal oxide to a temperature between about 600° C. to about 800° C. in an environment of a noble gas. This treatment modifies the catalyst such that, when it is cooled to room temperature, it is capable of catalyzing the decomposition NOx species to nitrogen and oxygen at sub-ambient temperatures and above without the need for a reducing species to be present.

The noble gas is selected from the group consisting of helium, neon, krypton, xenon and radon. In one method, the noble gas is helium. The catalyst is heated to a temperature that is sufficient to reduce the concentration of water absorbed/adsorbed to the catalytic active surface. Hence, the concentration of surface hydroxyl moieties that contribute to the non-specific adsorption of emission effluent species that mitigate the catalytic efficiency is lowered. In one embodiment, this temperature is from about 700° to about 750° C., although it is anticipated that significantly lower temperature thermal treatments would achieve comparable results for many catalytic formulations and embodiments described herein.

In one embodiment, the catalyst composition for the decomposition of nitrogen oxides according to the present invention consists of at least one noble metal dispersed on at least one metal oxide possessing more than one oxidation state. Noble metals include platinum, palladium, gold, silver, ruthenium, and rhodium and can comprise about 1 to 50 percent of the catalyst by weight with the balance (about 50-99 percent) being the metal oxide(s). In one preferred embodiment, the noble metal is platinum. The metal oxides upon which the noble metal can be dispersed include tin oxide, manganese oxide and copper oxide. In one preferred embodiment, the metal oxide is tin oxide. In at least one embodiment, promoter metal oxides (e.g., $Fe_2O_3$, NiO, $Co_2O_3$ and/or $WO_3$) can be included to improve catalytic performance. The catalyst can exist as a powder, or it can be prepared as a coating on supports, such as metallic, ceramic, composite or other material with a hydroxylated surface, in geometries or forms that include granules, pellets, honeycomb monoliths, or fabrics.

A catalyst employed in the present inventive process can be prepared as follows:

The preparation of similar powder catalysts or catalysts coated on silica gel, silica beads, or pellets has been presented in our earlier U.S. Patents: "Process for Making a Noble Metal on Tin Oxide Catalyst," U.S. Pat. No. 4,855,274, "Catalyst for Carbon Monoxide Oxidation," U.S. Pat. No. 4,912,082, and "Catalyst for Carbon Monoxide Oxidation," U.S. Pat. No. 4,991,181.

Preparation of platinum-tin oxide-based catalyst coatings for pellets, beads, granules, fabrics, and especially ceramic honeycomb monoliths can be accomplished by successive layering of the desired components, for example a tin oxide and platinum catalyst can be prepared as follows: (1) A clean, dry substrate is deaerated in a solution containing tin (II) 2-ethylhexanoate (SnEH, hereafter). The substrate is removed from the solution, and excess solution is removed from the substrate. Residual solution components are evaporated leaving SnEH layer on the substrate, which is thermally decomposed in air to tin oxide at 300° C. Several layers are applied in the same manner to achieve the desired loading of tin oxide; (2) platinum is added to the coated substrate as above using an aqueous solution of tetraamine platinum (II) dihydroxide or other platinum salt, with chloride-free salts being preferred, and then thermally decomposing the salt. Instead of thermal decomposition, however, a reductive decomposition can be used to decompose the salt. For example, the catalyst-coated substrate is heated in an atmosphere containing a reducing gas such as carbon monoxide or hydrogen to induce reduction of the platinum salt to platinum.

The instant process operates merely by passing a gaseous mixture containing nitrogen oxides over the catalyst using any of a number of methods well known in the art, and monitoring the gas composition both upstream and downstream of the catalyst.

There are numerous pertinent applications for this invention in addition to catalytic converters for internal combustion/automotive applications. These applications include, but are not limited to, air purification for heating, ventilation and air conditioning (HVAC) systems, and gas phase sensing technologies.

It should be understood that the foregoing description and examples are only illustrative of the invention. Various alternatives and modifications can be devised by those skilled in the art without departing from the invention. Accordingly, the present invention is intended to embrace all such alternatives, modifications and variances that fall within the scope of the appended claims.

The invention claimed is:

1. A method for making a catalyst composition for the decomposition of nitrogen oxides to nitrogen and oxygen comprising:
    (a) preparing a catalyst comprising at least one noble metal and at least one metal oxide;
    (b) heating said catalyst to a temperature between about 650° C. and 800° C. in the presence of a noble gas,
    wherein a concentration of hydroxyl is lowered on a surface of the catalyst without using a reducing gas, and wherein the noble metal comprises about 50% by weight of the catalyst and the metal oxide comprises tin oxide.

2. The method of claim 1, further comprising:
    (c) using the catalyst to decompose nitrogen oxides to nitrogen and oxygen.

3. A method for making a catalyst composition for the decomposition of nitrogen oxides to nitrogen and oxygen without a reducing gas comprising:
    (a) preparing a catalyst comprising at least one noble metal comprising about 50% by weight of the catalyst, and at least one metal oxide;
    (b) heating said catalyst to a temperature between about 650° C. and 800° C. in the presence of a noble gas.

* * * * *